United States Patent
Hochhalter et al.

(10) Patent No.: US 6,828,522 B2
(45) Date of Patent: Dec. 7, 2004

(54) ADAPTABLE SERVO-CONTROL SYSTEM FOR FORCE/POSITION ACTUATION

(75) Inventors: Keith Hochhalter, Dayton, MN (US); Paul M. Romslo, Robbinsdale, MN (US); Troy D. Erickson, Annandale, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 92 days.

(21) Appl. No.: 10/274,506

(22) Filed: Oct. 18, 2002

(65) Prior Publication Data

US 2004/0074877 A1 Apr. 22, 2004

(51) Int. Cl.[7] .............................................. B23K 11/10
(52) U.S. Cl. ................................ 219/86.32; 219/86.41; 318/568.11; 901/42
(58) Field of Search ........................... 219/86.32, 86.33, 219/86.41, 110; 318/568.11; 901/42

(56) References Cited

U.S. PATENT DOCUMENTS

| | | | |
|---|---|---|---|
| 4,510,565 A | | 4/1985 | Dummermuth |
| 4,841,113 A | * | 6/1989 | Hamada et al. ............. 219/110 |
| 4,859,920 A | | 8/1989 | Kurakake et al. |
| 4,878,002 A | | 10/1989 | Heatzig et al. |
| 4,879,644 A | | 11/1989 | Gottshall |
| 4,908,556 A | | 3/1990 | Daggett et al. |
| 4,962,338 A | | 10/1990 | Daggett et al. |
| 5,241,250 A | | 8/1993 | Nagasawa et al. |
| 5,463,296 A | | 10/1995 | Fugere et al. |
| RE36,631 E | | 3/2000 | Tanabe et al. |
| 6,072,145 A | * | 6/2000 | Suita et al. .................. 219/110 |
| 6,124,693 A | * | 9/2000 | Okanda et al. ......... 318/568.11 |
| 6,188,190 B1 | | 2/2001 | Arakawa |
| 6,469,272 B2 | * | 10/2002 | Dugas et al. ............. 219/86.32 |

FOREIGN PATENT DOCUMENTS

| | | |
|---|---|---|
| EP | 0 209 604 | 12/1994 |
| WO | WO 01/01209 | 1/2001 |

* cited by examiner

*Primary Examiner*—Clifford C. Shaw
(74) *Attorney, Agent, or Firm*—Patterson, Thuente, Skaar & Christensen, P.A.

(57) ABSTRACT

An adaptable, servo-control system for force/position actuation generally includes an electric linear actuator and a controller. The controller interfaces with the electric linear actuator and with a number of I/O signals that are independent from the electric linear actuator. The controller interface to the independent I/O signals is transparent to the manner in which the I/O signals are produced. Rather the controller simply looks for the status of the I/O that is preferably received into the controller by hard-wiring or field bus I/O messaging such as from a industrial robot or programmable logic controller. The controller utilizes the I/O signals to select a number of parameters to generate a motion profile for closed loop-controlled, position actuation or force actuation of the electric linear actuator. The adaptable servo-control system is particularly suited to resistance weld systems wherein the electric linear actuator can replace the pneumatic actuator providing position and force actuation of the weld tip of the welding gun.

4 Claims, 10 Drawing Sheets

Fig. 8

| WELD INPUTS | FORCE (lb.) | THICKNESS (IN.) | DESCRIPTION |
|---|---|---|---|
| 1234 | | | |
| 0000 | — | — | NOT USED |
| 0001 | 1200 | 0 | TIP SEAT |
| 0010 | 150 | 1.5 | TIP DRESS |
| 0011 | 1200 | 1 | FORCE CHECK |
| 0100 | 1200 | 0.050 | LOC A (ROBOT OUT 341) |
| 0101 | 1000 | 0.40 | LOC B (ROBOT OUT 342) |
| 0110 | 850 | 0.35 | LOC C (ROBOT OUT 343) |
| 0111 | 760 | 0.030 | LOC D (ROBOT OUT 344) |

| OPEN INPUTS | POSITION (IN) |
|---|---|
| 5,6 | |
| 00 | 3 |
| 01 | 1 |
| 10 | 5 |
| 11 | — |

ENABLE INPUT: 7
CLOSE INPUT: 8          (ROBOT OUT 329)

WELDAXIS MOTION PROFILE

| SEGMENT | DESCRIPTION | ACCEL/ DECEL IN/SEC^2 | INITIAL VELOCITY (IN/SEC) | FINAL VELOCITY (IN/SEC) | TIME (SEC) | DISTANCE TRAVELED |
|---|---|---|---|---|---|---|
| 1 | ACEL TO SPEED | 1000 | 0 | 14.0 | 0.014 | 0.098 |
| 2 | CLOSE MOVE | 0 | 14.0 | 14.0 | 0.12 | 1.68 |
| 3 | DECEL TO LOW SPEED | 1000 | 14.0 | 1.0 | 0.013 | 0.097 |
| 4 | WAIT FOR TIP CONTACT | 0 | 1.0 | 1.0 | 0.125 | 0.125 |
| 5 |  | 0 | 1.0 | 1.0 | 0.03 | 0.03 |
| 6 |  | 1000 | 1.0 | 0 | 0.001 | 0.001 |
| 7 | WELDING | 0 | 0 | 0 | 0.5 | 0 |
| 8 | OPEN MOVE | 800 | 0 | -14.0 | 0.018 | 0.122 |
| 9 | OPEN MOVE | 0 | -14.0 | -14.0 | 0.163 | 1.786 |
| 10 | OPEN MOVE | 800 | -14.0 | 0 | 0.018 | 0.123 |
| 11 | WAIT FOR NEXT | 0 | 0 | 0 | 0.5 | 0 |

ADAPTABLE SERVO-CONTROL SYSTEM FOR FORCE/POSITION ACTUATION

FIELD OF THE INVENTION

The present invention is related to weld motion controllers and, more particularly, to an electric servo-control system for welding that has commonality from robot-to-robot and robot-to-hard-tool whether within a stand alone application or, new or retrofit robotic application.

BACKGROUND OF THE INVENTION

Resistance welding is a group of welding processes in which the joining of metal is produced by the heat obtained from resistance of the work to the electric current, in a circuit of which the work is a part, and by the application of pressure. The three factors involved in making a resistance weld are the amount of current that passes through the work, the pressure that the electrode tips transfer to the work, and the time that the current flows through the work. The factor of present concern is the pressure that the electrode tips may transfer to the work. This pressure must be precise and consistent throughout the weld cycle to assure a continuous electrical circuit through the work and prevent weld splash. The pressure must further be consistently repeatable upon the next iteration of the weld cycle to assure conformity among welds.

Most resistance welding performed today is done so by robots or hard-tooled fixtures utilizing pneumatic actuators to deliver the pressure required between electrode tips. The pneumatic actuation occurs in a "slam open"/"slam closed" manner providing no precision control and no guaranteed repeatability of operation. Now that the advantages of an electric servo actuator over that of a pneumatic actuator have been realized in the areas of precision control and repeatability, it is desirable to provide these advantages in a process that is truly dependent upon control and repeatability, namely, welding.

However, an industrial welding environment can present multiple robot types as well as multiple types of welding fixtures. To retrofit each of these robots or fixtures from pneumatics to operation with an electric servo actuator would generally require an in-depth knowledge of each robot's and each welding fixture's own unique components, unique control system, and unique weld motion program, each requiring its own unique modifications thereto. The result is a complicated welding system running under different programs and languages, requiring different replacement parts, and costing a tremendous amount of money and time.

In an ideal situation, the various robots and fixtures would each be retrofit with the same adaptable servo-control system that could make use of the existing pneumatic input and output signals. Each adaptable servo-control system would utilize the same components, the same control systems and the same weld motion programs to limit the amount of time, knowledge, and cost required. The servo-control system would present commonality in all applications via hardware configurations yet be adaptable, through software configurations, e.g., adjustment of program parameters and recognition of existing pneumatic input and output signals, to accommodate the differences in applications.

SUMMARY OF THE INVENTION

The needs described above are in large part met by the adaptable, servo-control system for force/position actuation of the present invention. The servo-control system generally includes an electric linear actuator and a controller. The controller interfaces with the electric linear actuator and with a number of I/O signals that are independent from the electric linear actuator. The controller interface to the independent I/O signals is transparent to the manner in which the I/O signals are produced. Rather the controller simply looks for the status of the I/O that is preferably received into the controller by hard-wiring or field bus, e.g., DeviceNet I/O messaging or Profibus, such as from a industrial robot or programmable logic controller. The controller utilizes the I/O signals to select from a number of pre-established parameters to generate a motion profile for closed loop-controlled, position actuation and/or force actuation of the electric linear actuator.

In an alternative embodiment, the controller interfaces with and controls more than one electric linear actuator but does so through use of a single motion control program. The single motion control program includes a number of characterizable parameters, each of which can be independently characterized for each electric linear actuator the controller is to control. The characterizable parameters are preferably user-entered/selected through a single programming device that is connectable to the controller. In a preferred embodiment, this single programming device is a portable, programming pendant. In utilizing the I/O signals and character parameters, the controller preferably creates a bit-mapped table that is referenced by the motion control program, i.e., the bit-mapped table maps input signals to specific position or force actuations of the linear actuator.

The servo-control system is particularly suitable to resistance welding systems, whether fixture systems or industrial robot systems, where the electric linear actuator can be used to position or force actuate the welding tip of the welding gun. Again, the controller can interface with more than one electric linear actuator to effect different and independent weld operations per each electric linear actuator and can use a single motion control program with characterizable parameters per each linear actuator. The servo-control system may additionally monitor weld tip wear through various programmed operations and can observe the safety, stop operation features of a robotic welder by linking into that feature, i.e., using the controller to monitor the I/O signal enabling operation of the robot.

The controller of the servo-control system generally includes a computer and a motion controller/drive that is operably coupled to the computer. The computer receives the characterized parameters and downloads the parameters to the motion controller/drive, which then performs the operation of closed loop control of the electric linear actuator according to the hard coded program. The controller may include more than one motion controller/drive, and preferably includes one motion controller/drive per each linear actuator.

BRIEF DESCRIPTION OF THE DRAWINGS

FIG. 8 is an example of a bit-mapped table that may be referenced by the motion control program.

DETAILED DESCRIPTION OF THE PREFERRED EMBODIMENTS

I. System Overview

The present invention comprises, an adaptable servo-control system for force/position actuation in various welding applications including resistance welding, and more specifically, spot welding, applications. In other words, the present invention operates as an independent "weld axis" system. The adaptability of the weld axis system enables the present invention to operate as an interface to existing six-axis robots in both new and retrofit situations, as well as a stand-alone, welding gun fixture. In all situations, the weld axis system is substantially ambivalent to the control scheme and/or programming language in an existing robot but is able to use those inputs/outputs typically used by a pneumatic valve for weld gun actuation to control an electric linear actuator to deliver the desired motion profile and squeeze force that would typically have been delivered by a pneumatic actuator.

Figure 1:
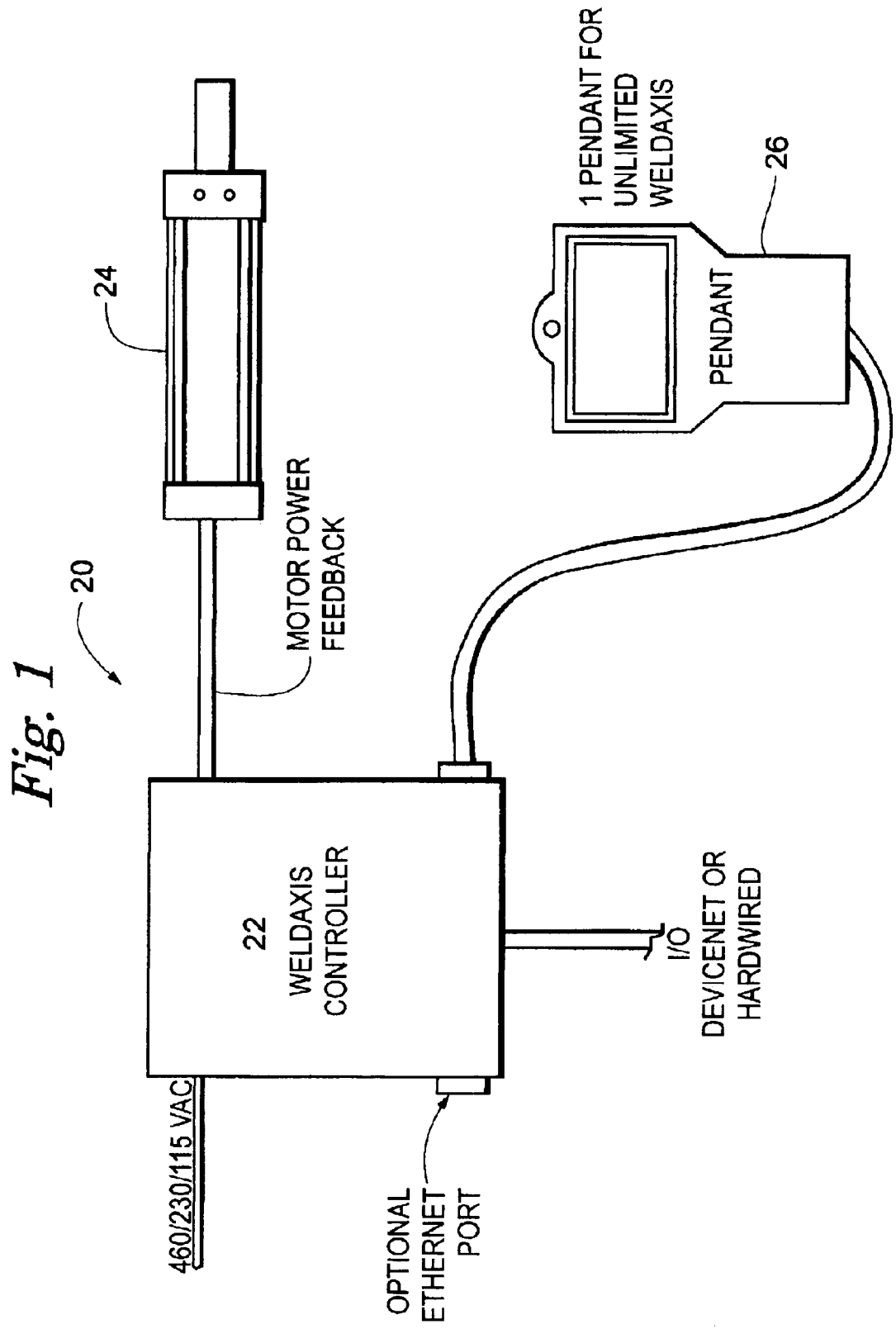
FIG. 1 is a schematic diagram of the adaptable, servo-control system for force/position actuation system (weld axis system) of the present invention.

Referring to FIG. 1, a schematic diagram of the weld axis system 20 of the present invention is provided. As indicated, the weld axis system 20 generally comprises the elements of a control system, a.k.a., a weld axis controller 22, an electric servo linear actuator 24, and a programming pendant 26. The motion of the electric servo linear actuator 24, under direction of the weld axis controller 22, provides the positioning and squeeze force required of the weld gun 28 (see FIG. 2); the current delivered by the weld gun 28 to effect the weld is under control of a separate weld controller (not shown) that is triggered for delivery by the robot or fixture. The programming pendant 26 enables a user of system 20 to setup and characterize the operation of the weld axis system 20 for a specific application.

Figure 2:
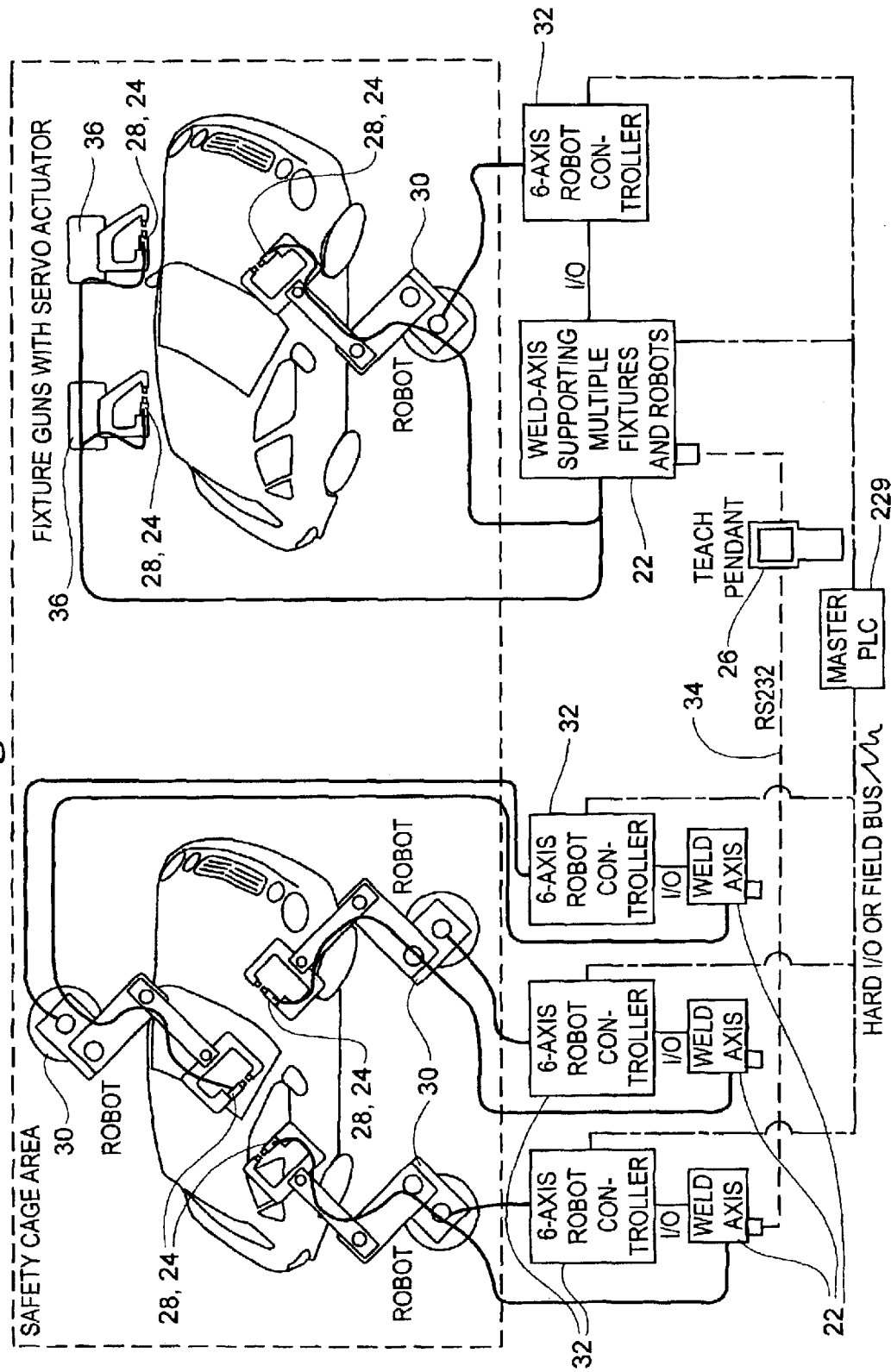
FIG. 2 depicts an assembly line situation making optimal use of the adaptable, servo-control system for force/position actuation system of the present invention by interface with six-axis robots and as independent weld gun fixtures.

FIG. 2 presents just one of many possible scenarios of the potential combinations and uses of the weld axis system 20. Specifically, FIG. 2 depicts an assembly line, multi-weld situation that is controlled by a master PLC (programmable logic controller) 29 wherein to the left side of the figure, three six-axis robots 30 have each been individually interfaced via their controllers 32 to a weld axis controller 22. The I/O indicating requests for weld motion from the robot, e.g., those that would typically be provided to a pneumatic actuator, are provided from the controller 32 to the weld axis controller 22. The transfer of I/O between the controller 32 and the weld axis controller 22 is preferably through some sort of field bus such as Profibus or DeviceNet I/O messaging.

In the left-side configuration of FIG. 2, only one electric servo linear actuator is controlled per weld axis controller 22. However, referring to the right-side configuration of FIG. 2, the weld axis controller 22 has been configured to cluster and control from a single weld axis controller 22 a plurality of electric servo linear actuators 24 within weld guns 28. Each electric servo linear actuator 24, whether under cluster control or single control, is able to be independently programmed for desired weld motion through use of programming pendant 26. The single programming pendant 26 is communicatively connectable to each weld axis controller 22, preferably through an RS-232 connection 34, for individual setup and characterization for the operation of each electric servo linear actuator 24.

Further, with regard to the right-side configuration of FIG. 2, it can be seen that the weld axis system 20 may be implemented in conjunction with a six-axis robot 30, new or existing, and may also be implemented as a stand alone, welding gun fixture 36. In the instance of a welding gun fixture 36, the I/O indicating requests for weld motion are received directly into the weld axis controller 22 either from the master PLC 29, via field bus I/O messaging, or through hard-wired I/O.

II. System Components

Referring once again to FIG. 1, and to reiterate that from above, the weld axis system 20 generally comprises the elements of a control system, a.k.a., a weld axis controller 22, an electric servo linear actuator 24, and a programming pendant 26. The motion of the electric servo linear actuator 24, under direction of the weld axis controller 22, provides the positioning and squeeze force required of the weld gun 28 (see FIG. 2); the current delivered by the weld gun 28 to effect the weld is under control of the robot or fixture. The programming pendant 26 enables a user of system 20 to setup and characterize the operation of the weld axis system 20 for a specific application.

II.A. System Components—Weld Axis Controller

Figure 3:
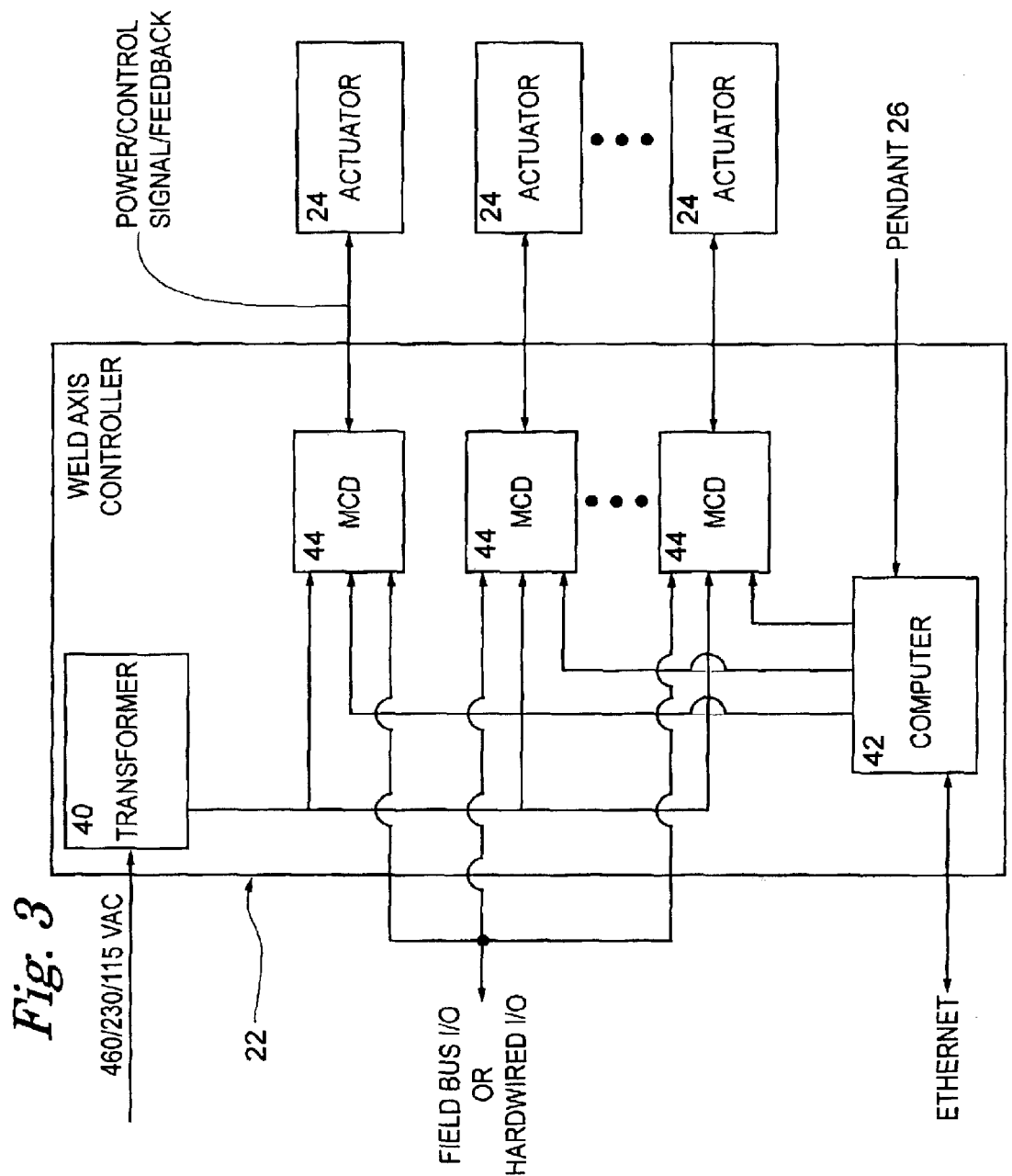
FIG. 3 is a block diagram of a weld axis controller.

FIG. 3 provides a block diagram of the weld axis controller 22. The weld axis controller 22 generally includes a transformer 40, a computer 42, and at least one motion controller/drive/PLC (MCD) 44. FIG. 3 depicts an embodiment of the weld axis controller 22 wherein three MCDs 44 are utilized. Such a configuration would be suitable to the right-side configuration of FIG. 2 wherein the control of three electric servo linear actuators 24 has been clustered. It should be noted, however, that any number of MCDs 44 may be used within the weld axis controller 22, if suitable to the application, without departing from the spirit or scope of the invention.

The transformer 40 is well known in the art and operates to convert the intake AC voltage to a level suitable for powering the MCDs (which in turn power the electric servo linear actuators 24). In an alternative embodiment, the transformer need not simultaneously power all MCDs 44 but may be set up to power a single MCD on a timed basis enabling the use of a smaller transformer.

The computer 42 is preferably a low-cost computer whose main function is to act as a conduit between the programming pendant 26 and the MCDs 44. The computer 42 requests information via the programming pendant 26 through various prompts and tables presented to the user at the pendant 28. Beyond receiving data entered through the programming pendant 26, the computer 42 is further capable of processing calibration data, of using the data to establish register values, and of downloading these register values to the appropriate MCD 44 as well as of uploading/downloading changes in I/O, preferably through the use of ASCII serial port commands or other appropriate means. The computer 42 may be provided with an optional ethernet connection, other wired or wireless connection, to enable connection of the computer 42 to a remote computer or network. Note, that in an alternative embodiment, the functions performed by the computer may be implemented partially or entirely within the MCD 44 by making the appropriate hardware and software modifications to the MCD 44.

The MCD 44 preferably performs three functions: 1) a motion controller; 2) a drive; and 3) a programmable logic controller (PLC). In its performance as a motion controller, the MCD 44 preferably provides commands for absolute, incremental, and velocity moves, time delays, wait-on conditions/inputs, output/flag control, parameter value changes including torque limit, following error, position band, trigger points for in-motion changes and maximum velocity. Of course, other commands may be provided without departing from the spirit or scope of the invention. Further, in its performance as a motion controller, the MCD 44 preferably provides for event triggering based on intermediate positions as well as motion pause and resume.

In its performance as a drive, the MCD 44 preferably utilizes space vector commutation for efficient bus voltage utilization and optimal speed/torque curves. The MCD 44 also preferably utilizes flux vector current control to enable accurate high bandwidth control of torque producing current for high efficiency and maximum torque over the full speed range of the drive. The MCD 44 also preferably makes accommodation for a drive enable input.

In its performance as a PLC, the MCD 44 preferably provides for a real-time scan supervisory function that is continuous from power-up along with a typical scan-time of less than 2 milliseconds. The MCD 44 also preferably provides the option of ladder logic programming, e.g., providing 175 rungs of logic, up to four lines deep with five input operations and one output coil. The operations of the ladder logic preferably include normally-open, normally-closed, logical invert, one-shot timer, output coil, latch, unlatch, timers and counters, as well as register transfers and compares. Internal bit-flags for information transfer between the motion controller and the PLC functions.

A product generally meeting all of the criteria outlined above for the MCD is the Tol-O-Matic AXIOM® PLUS PV SERIES BRUSHLESS SERVO/CONTROLLER/DRIVE/PLC, available from Tol-O-Matic, Inc. of Hamel, Minn. The user manual for the AXIOM® PLUS, identified by publication number 3600–4628_01, is hereby incorporated by reference in its entirety. At the current time, features specific to the present application are provided by firmware and software identified through Version number 1.04d(IP).

In the most basic of terms, the MCD 44 powers and provides servo control of the electric linear actuator 24. Specifically, the MCD 44 provides the actuator 24 with power and receives from the actuator 24 a position feedback signal to achieve closed loop control of the actuator 24 according to a desired weld motion. The commutated power signal is generated by a program stored in the memory of the MCD 44 and may be initiated by external I/O or internal operating parameters. The program within the memory of the MCD has been placed by first collecting and processing information within the computer 42 then downloading the information to the memory of the MCD 44.

II.B. System Components—Electric Servo Linear Actuator

Figure 4:
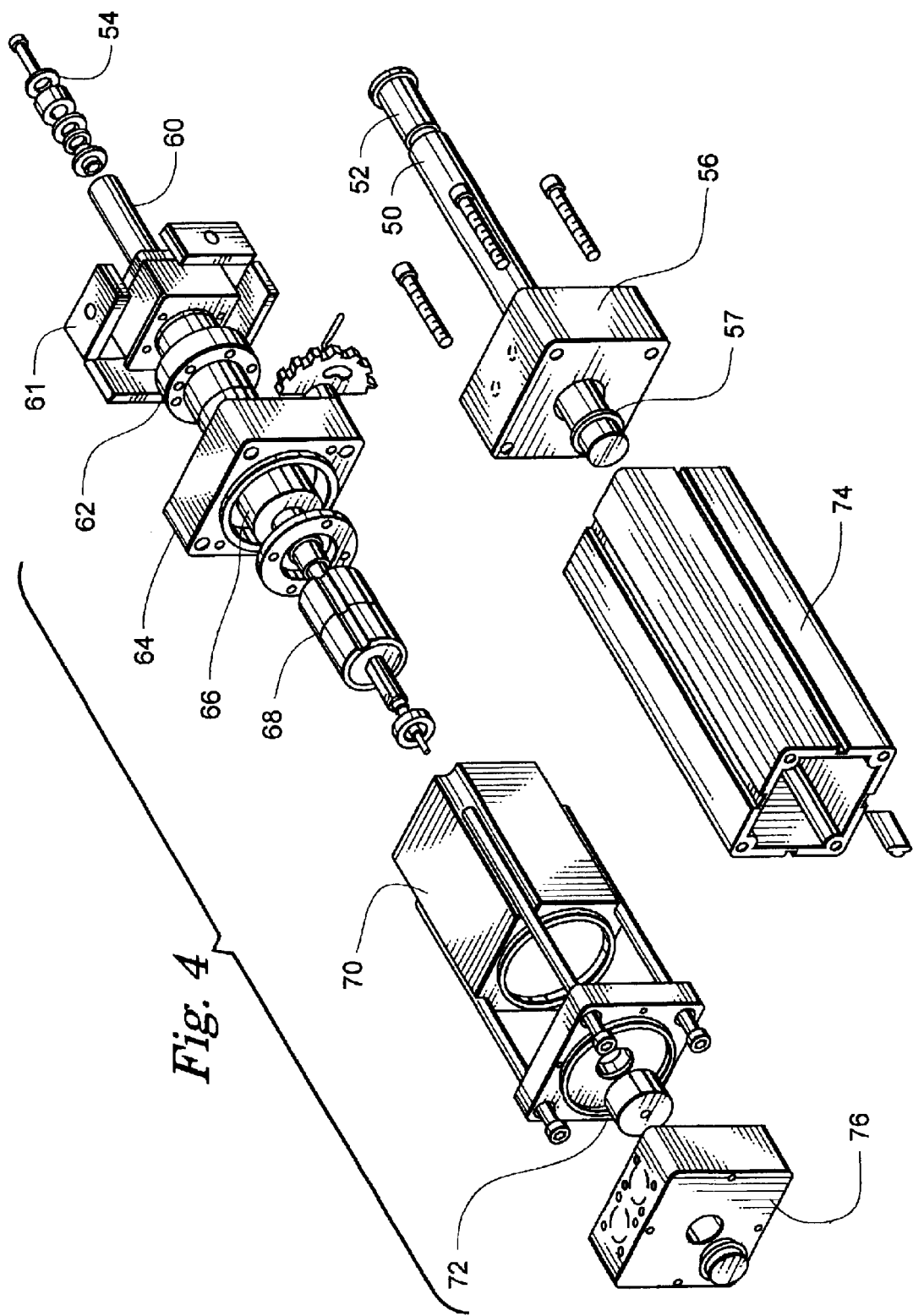
FIG. 4 depicts a high-thrust electric servo linear actuator.

The electric servo linear actuator 24 is preferably a rod screw actuator and is selected dependent on the application and the weld force required. The preferred rod screw actuator, the Tol-O-Matic HT Series actuator, an assembly drawing is provided in FIG. 4. As shown, the HT series rod screw actuator generally includes a thrust rod 50 having a machined rod end 52. The thrust rod 50 is coupled to a lead screw 54 via a bearing assembly 56 and nut assembly 57. A shaft 60 of the lead screw 54 passes through a bearing plate 61 and second bearing assembly 62. The shaft 60 continues through a spacer 64 and third bearing assembly 66 to support the windings 68 of an actuator-integrated motor. A housing 70 is provided about the windings 68 and enables an encoder 72 to be coupled to the shaft 60. A cylinder body 74 houses the components of the actuator 24 while an end cap 76, providing wiring access for power, control signal, and encoder feedback, creates a sealed unit. At the current time, the Tol-O-Matic HT series of actuators are comprised of three actuators including the HT7, HT12, and HT23 wherein each is capable of providing up to 700, 1200, and 2300 lbs of weld force, respectively. The Tol-O-Matic HT series actuator is described in detail in pending U.S. patent application Ser. No. 10/057,833, filed Jan. 24, 2002, and entitled "Electric Actuator"; the identified U.S. patent application is hereby incorporated by reference in its entirety.

Figure 6:
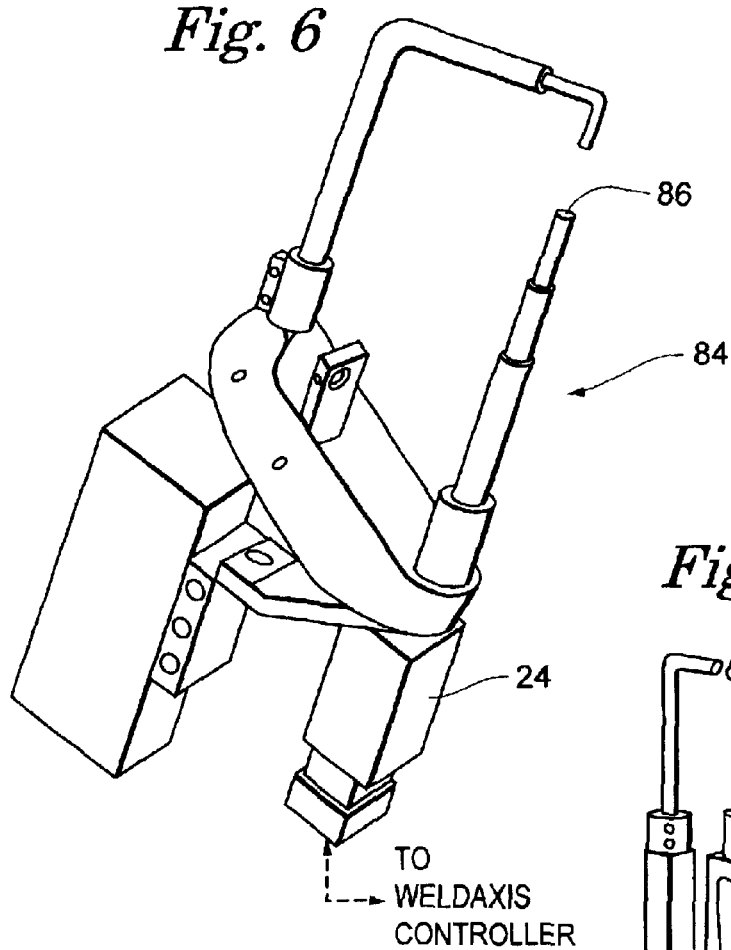
FIG. 6 depicts the actuator of FIG. 4 utilized within a C-clamp weld gun.
Figure 5:
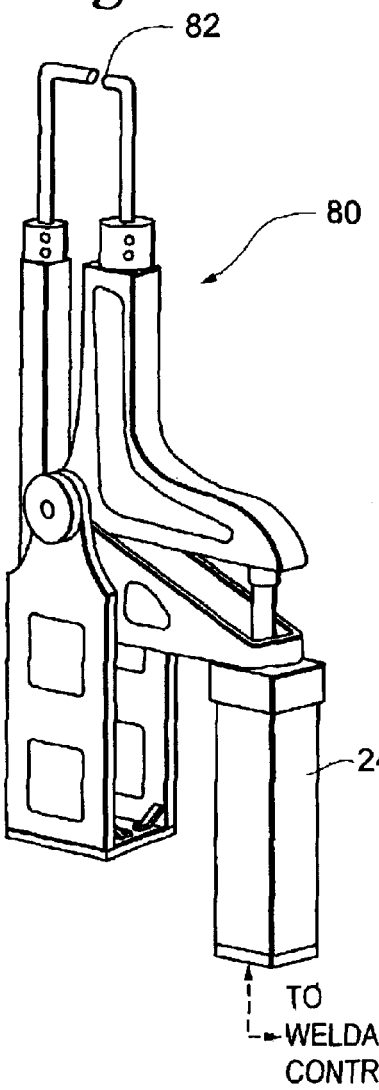
FIG. 5 depicts the actuator of FIG. 4 utilized within a scissor weld gun.

The integrated motor design of the HT series actuator eliminates the need for a coupler and provides for overall decreased weight and footprint. Specifically, the compact package of the actuator 24 enables it to fit most pneumatic cylinder footprints making it particularly suitable to retrofit robotic applications as well as virtually all other resistance welding robotic or fixture applications. FIG. 5 depicts a typical pneumatic, scissor weld gun 80 wherein the location normally reserved for a pneumatic actuator has been easily replaced by the electric servo linear actuator (HT series actuator) 24 enabling the electrode tip 82 to reliably and repeatedly deliver the desired weld force. FIG. 6 demonstrates how the electric servo linear actuator 24 can just as easily replace the pneumatic actuator in a pinch or C-style welding gun 84, once again enabling the electrode tip 86 to reliably and repeatedly deliver the desired weld force.

It should be noted that while the Tol-O-Matic HT series actuator is the preferred electric servo linear actuator 24 of the present invention, other types of electric servo linear actuators may be used without departing from the spirit or scope of the invention.

II.C. System Components—Programming Pendant

Figure 7:
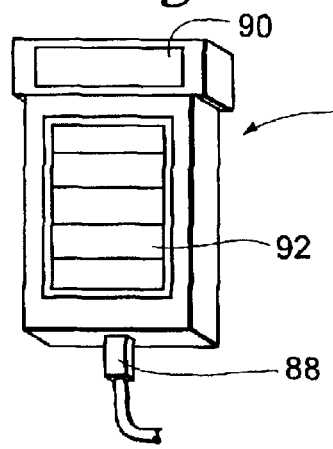
FIG. 7 is an example configuration of a programming pendant.

The programming pendant 26 is a portable pendant that may be used for the set-up and/or re-characterization of any weld axis controller 22. An example of a possible configuration of the programming pendant is provided in FIG. 7; of course, other programming pendant configurations may be used without departing from the spirit or scope of the invention. The programming pendant of FIG. 7 is provided with an RS-232 communication connection 88 enabling quick access and communication with the weld axis controller 22. The programming pendant 26 is also provided with a visual interface 90 and a tactile interface 92. The visual interface 90 provides for visual prompting of the user while the tactile interface provides a means for user data entry or selection.

III. System Operation

The setup of all weld axis systems 20, whether a robotic or hard-tool fixture application, is preferably performed through use of a single, pre-established weld motion program. The single weld motion program is adjusted for specific weld applications only by values stored in registers during the setup and characterization of the weld axis controller 22. These values are initially obtained by the computer 42 of the weld axis controller 22 through user interaction via the programming pendant 26. Upon completion of the setup and characterization, the now defined, specific weld application registers are downloaded to the MCD 44 of the weld axis controller 22 whereby the MCD 44 provides continuous closed servo loop control of the electric linear actuator 24.

III.A. System Operation—Setup and Characterization

The operation of a specific MCD 44 and its connected linear actuator 24 is achieved through its programmed setup and characterization parameters. These parameters are preferably entered through the programming pendant 26 by prompting the user with a plurality of user-interactive, menu-driven screens that include the following menu selections: 1) Setup; 2) Current vs. Force; 3) Define Close; 4) Open Position; and 5) Weld Schedule.

III.A.i. System Operation—Setup and Characterization—Setup Parameters

Selection of the setup menu option preferably prompts the user to enter a series of parameters that will help define the overall operation of the weld axis system 20. Specifically, the user is prompted to enter the model of the actuator 24. In the preferred embodiment of the present invention, the single weld motion program has been pre-programmed to recognize a plurality of linear actuators, e.g., a plurality of Tol-O-Matic electric servo, linear actuators such as the HT Series actuators, and to recall the fixed operating parameters/characteristics associated therewith. This feature eliminates the need for the user to enter the non-adjustable, non-changing parameters of the actuator. The various operating parameters of the actuators that are pre-programmed and recallable preferably includes the number of encoder counts per inch of travel of the actuator, the maximum torque the actuator can provide, etc. Of course, a user may also simply enter the various operating parameters should recall of an existing actuator be possible or desirable.

Further, within the setup menu selection, the user is also prompted to enter the measurement units that will be used, e.g., imperial or metric, as well as to define the allowable tip wear, e.g., ¼ inch, and the thrust capacity, i.e., the maximum thrust the gun can deliver (in the instance of a rod screw linear actuator, such as the Tol-O-Matic HT Series actuators, the thrust capacity is the axial load which the screw and nut can deliver to the rod). The user is further prompted to select the tip closed direction and to enter the gun reduction. The gun reduction is generally defined as a ratio of the arm lengths of the welding gun, wherein the first arm length of the ratio is the weld tip to pivot point distance and the second arm length of the ratio is the actuator point of contact to pivot point distance. By way of example, a gun reduction of two would mean that for a 1200 lb. thrust at the weld tips, the actuator would have to supply 2400 lbs. of force.

Finally, within the setup menu selection the user is prompted to establish the actuator position limits (tips not present). By selecting the actuator position limits option, the MCD 44 initiates movement of actuator 24 in the close direction until a hard stop is reached. This position value is recorded in a register as a position limit that should never be exceeded thereby protecting the actuator.

III.A.ii. System Operation—Setup and Characterization—Current vs. Force Parameters Upon selecting the current vs. force option from the menu via the programming pendant 26, the user is provided with the opportunity to calibrate the torque output to the force seen by the weld gun. In the preferred embodiment, the weld motion program utilizes ten percent increments of torque output. At each ten percent increment, the MCD 44 sets the respective torque while the programming pendant 26 prompts the user to enter in, using a force gauge for measurement, the measured value that the given torque produces. The weld motion program continues the ten percent increment until the previously entered thrust capacity of the gun is reached or 100 percent torque is delivered. From this correlation, any force that is later entered into the weld motion program will automatically be converted by the program to a desired current in the drive.

III.A.iii. System Operation—Setup and Characterization—Define Close Parameters Upon selecting the define close option from the menu via the programming pendant 26, the MCD 44 initiates motion to close the welding tips. After the close motion has been completed, the programming pendant 26 operates to prompt the user to enter whether the welding tip is a new tip. If it is indeed a new tip, the weld motion program accesses the previously entered allowable tip wear value as a reference point for the welds enabling monitoring of tip wear. As such, at a desired time, the user may connect the programming pendant 26 to the weld axis controller 22 to access a desired MCD 44 and trigger an input to request a check of tip wear. A close is then initiated by the MCD 44 and a comparison is made by the MCD 44 between the current closed position and the initial "new tip" closed position. Alternatively, the MCD 44 may be programmed to receive an input request from a non-pendant, external device, e.g. master controller, for a tip wear check. The MCD 44 can be programmed to perform the check in response to the input and to provide an output to the external device indicating whether or not the allowable tip wear has been exceeded.

The result of the comparisons, i.e., the difference between the two positions, can then be utilized by the MCD 44 for two purposes. The first purpose is to tell the user if the allowable tip wear limit has been reached and the second purpose is to adjust the weld motion profile of the weld motion program within the MCD 44. Upon detecting wear of the tip, the initial point of deceleration of the actuator is extended; the more wear, the more the deceleration is extended. Extending the initial deceleration point keeps the low speed approach time to a minimum thereby maximizing weld cycle time.

III.A.iv. System Operation—Setup and Characterization—Open Positions Parameters Upon selecting the open positions option from the menu via the programming pendant 26, the user may define a plurality of positions as open gun positions based on a binary output received from a hard-wired output, robot controller, or master PLC. These open gun positions are generally used by the weld motion program to move the weld tip to an open position after a weld has been completed and/or as a default position when no motion is occurring, and are preferably maintained in a simple look-up table format. The received binary output is used by the weld motion program to point to a certain value within the table causing the MCD 44 to initiate a corresponding open motion in the actuator.

III.A.v. System Operation—Setup and Characterization—Weld Schedule Parameters Upon selecting the weld schedule option from the menu via the programming pendant 26, the user may define a plurality of forces and corresponding material thickness based on a binary output received from a hard-wired output, robot controller, or master PLC. From the calibration that occurred in the "current vs. force" option, the force selected by the received output can then be converted to a current setting for the actuator drive. The material thickness selected by the received output is used by the weld motion program within the MCD 44 to calculate a deceleration point to slow down from a fast traverse to a final, contact velocity. This calculation is based upon the previously defined close position.

As such, deceleration does not always start at the same point without regard to the tips and/or the material thickness.

Rather, the maximum material thickness (previously entered and stored) is subtracted from the closed position, as is the deceleration distance, to produce the point at which deceleration is to start. By utilizing this calculation, the wasted time that would result from slow contact speed if the deceleration took place too early is eliminated. The tip wear information is preferably similarly used to add distance to begin deceleration as the tips wear.

III.B. System Operation—Bit Mapping

As referenced in the setup and characterization description in the paragraphs immediately above, the weld motion program utilized by the MCD 44 preferably takes advantage of bit-mapped tables for its operation. An example of a bit-mapped table is provided in FIG. 8. In this example, the weld motion controller utilizes four weld inputs (four that are typically associated or had been previously used with pneumatic actuation), the combinations of which correspond to a specific force and material thickness, which corresponds to a weld motion program operation. Specifically, when weld input four is high, a tip seat operation has been requested of the weld motion program. The tip seat operation has a 1200 lb. force and 0 inch material thickness associated with it. These force and material parameters are accessed by the weld motion program so that the appropriate control signal may be sent from the MCD 44 to the actuator 24 to achieve the desired operation. Tip dress and force check operations may be similarly requested.

A position/location operation may also be requested of the weld motion program by receiving a binary output from a robot (or PLC or hard-wired output). In the instance of receiving binary robot output 341, the weld motion program knows that it is associated with the operation of moving to a location A, which corresponds to bit two of the weld input bits being high and bits one, three, and four being low. When bit two is high and the other bits low, the weld motion program knows that a force of 1000 lbs. and a material thickness of 0.050 are the parameters to define the force and motion of the actuator, and a control signal is generated by the weld motion program to achieve the desired action. Locations B, C, and D may be similarly requested.

Through the bit-mapping described above, a user is able to use the I/O to select parameters that will optimize the motion profile of the actuator without having to enter the inner programming language of the controller. The user is not required to enter a plurality of different profiles for the actuator based on material thickness, closed position and open position, rather the profiles are automatically generated through the easily generated, user-defined bitmap (as entered through the programming pendant).

Continuing with the example, and the table of FIG. 8, the weld motion program utilizes two open inputs, an enable input and a close input. The various combination of the open input bits corresponds to a requested position upon which the weld motion program may act. The enable input and close input are preferably used for system safety. Specifically, it should be noted that in the instance of the weld axis system being used with a robot, all safety issues remain in control of the robot with the weld axis system linking into those safety precautions provided by the robot. In particular, it is an output from the robot (appearing as the close input) that initializes motion within the weld axis system, without it the weld axis system does not move.

Further, with regard to safety within a typical welding work cell, an emergency stop (estop) safety circuit is included. When estop is triggered, the circuit preferably trips contactors in the MCD that first stops the motion of the actuator and then disconnects the power to the motor of the MCD. The drive/control portion of the MCD remains energized to maintain the encoder position of the actuator. The estop safety circuit is preferably hardwired to a time delay contactor. The contactor has one output that opens immediately; this output is used to stop the motion through an input to the MCD. The contactor has a second output that has a selectable time delay that gives the MCD time to stop motion before it opens the motor power connections.

A typical welding work cell additionally includes a live man switch, i.e., when a user enters the work cell, he must hold the live man switch in order to produce any motion. When used with the present system, the live man switch must be depressed for motion of the actuator and when the live man switch is dropped out the MCD, as with the estop, first stops the motion of the actuator and then disconnects the power to the motor of the MCD. Meanwhile, the drive/control portion of the MCD remains energized to maintain the encoder position of the actuator.

It should be noted that while the above bit-mapping is described with reference to digital I/O, in an alternative embodiment analog I/O may be used.

IV. System Operation—Program Sequence

Figure 9:
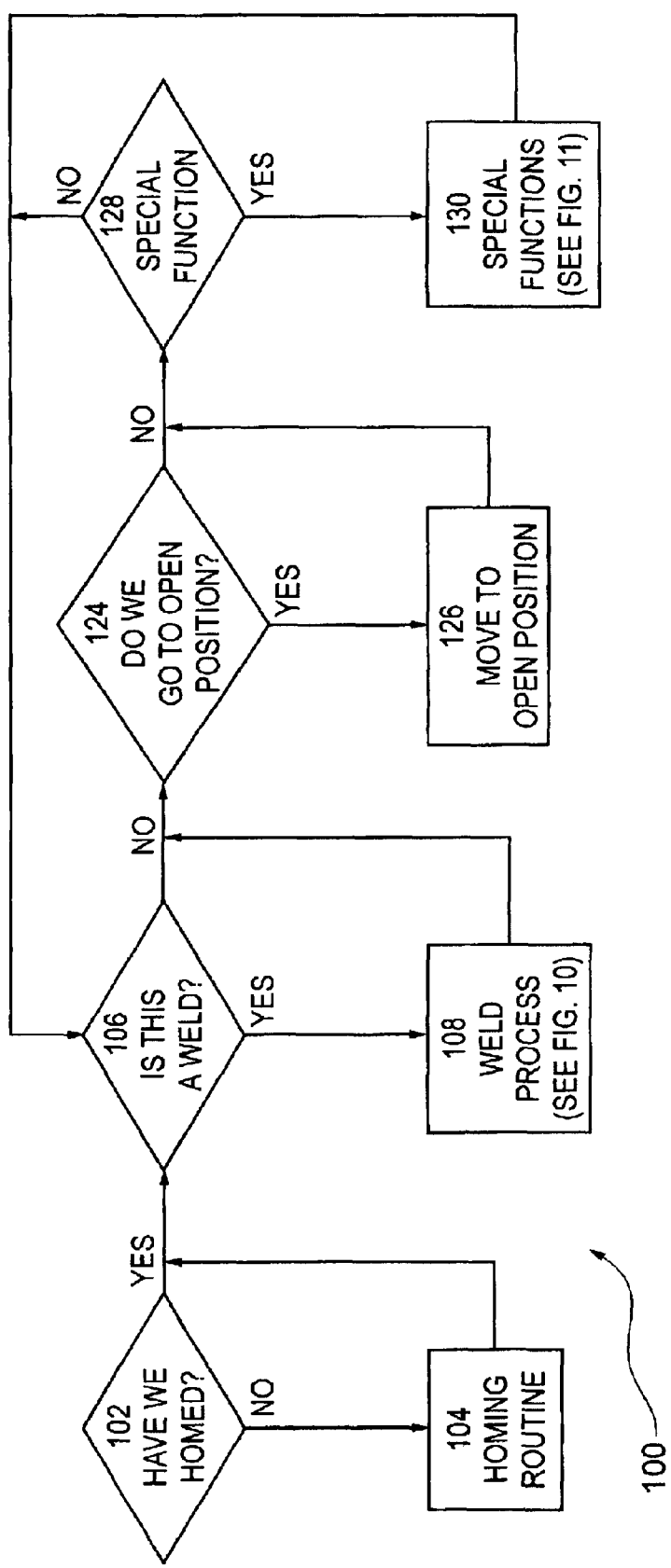
FIG. 9 is a flow chart depicting the preferred sequence of operations of the weld axis system.
Figure 10:
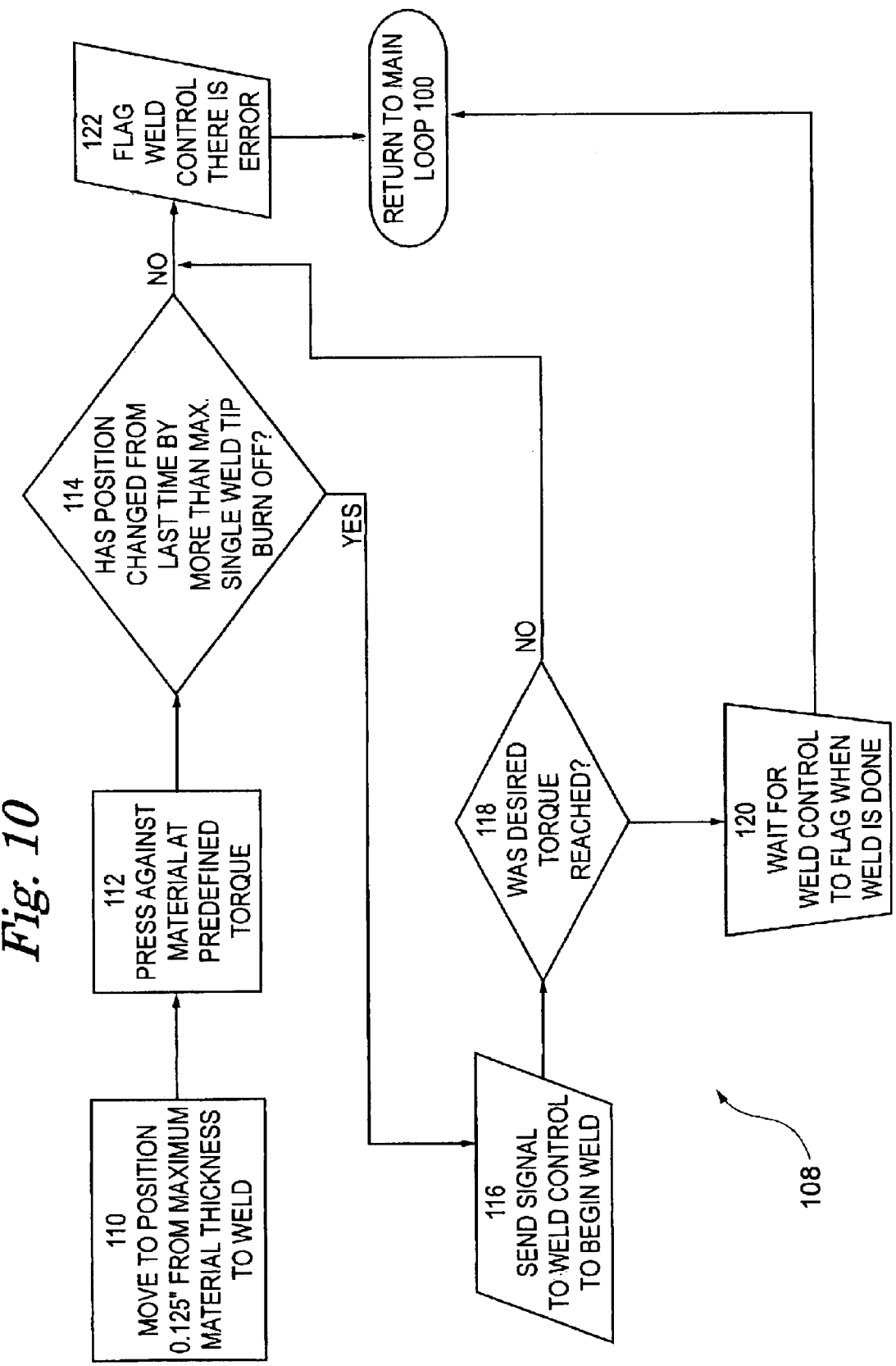
FIG. 10 is a flow chart depicting the operations performed by the weld axis system during the actual weld process.
Figure 11:
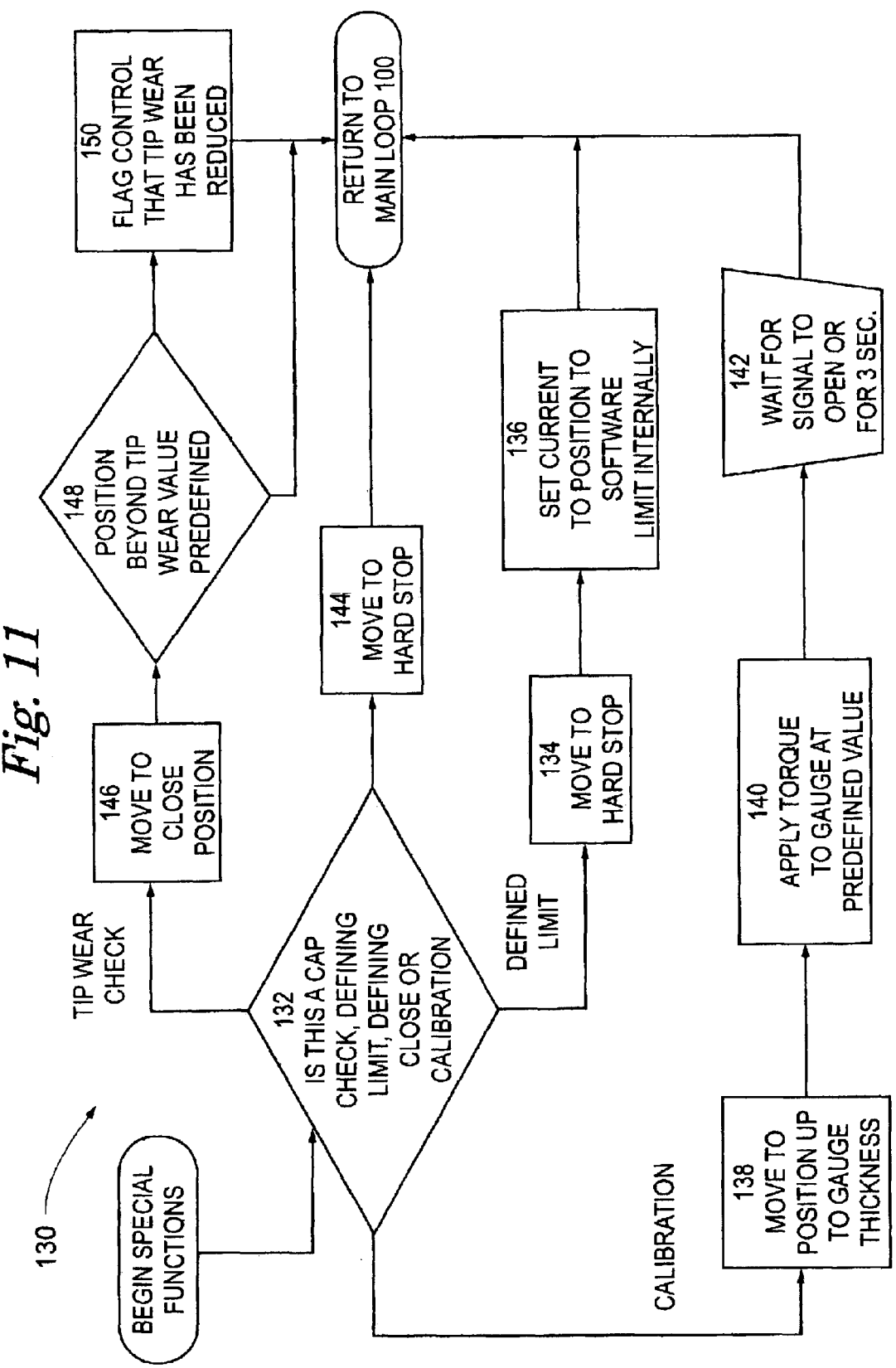
FIG. 11 is a flow chart depicting the operations performed by the weld axis system during non-weld operations.

The preferred sequence of operation of the weld axis system of the present invention is diagrammed in the flow charts of FIGS. 9, 10, and 11. Of course, other and/or additional operational sequences may be implemented with the weld axis system without departing from the spirit or scope of the invention.

Per FIG. 9, the weld axis system operation 100 begins, per decision block 102, by determining if the actuator is in its defined home position. If the actuator is not at its home position, a homing routine is preferably performed, per operations block 104, whereby the actuator is returned to its home position. Once at a home position, the program within MCD determines, per decision block 106, whether it has received an instruction that a weld is to be performed. If a weld is to be performed, the sequence of operation for the weld process begins per operations block 108, further detailed with reference to FIG. 10.

Per FIG. 10, the weld process 108 of the weld axis system begins by the actuator moving the tip to a position 0.125 inches from maximum material thickness (previously entered parameter) to weld, per operations block 110. The actuator then presses the tip against the material at a predefined torque (previously entered parameter), per operations block 112. The program within the MCD then questions whether the position of the tip, for this weld force, has changed from the last time executed by more than a maximum single weld tip burn off (a parameter that may be programmed by the user or, more preferably, hard coded), per decision block 114. If yes, a signal is readied to be sent from the MCD through the computer to the weld controller that a weld should begin, per data block 116. However, prior to delivering the signal, the program within the MCD determines if a desired torque, as delivered by the tips, has been reached, per decision block 118. If the desired torque has been reached, the signal to begin the weld is delivered to the weld controller, and the MCD awaits the signal from the weld controller that the weld has been completed, per block 120. Upon completion, control is returned to the weld cycle 100 of FIG. 9. It should be noted that the manner in which the actuator moves during the weld process, e.g., from open to close position and close to open after delivery of the desired torque, is preferably defined by a motion profile. The preferred motion for profile for the actuator of the weld axis system is described in detail below in Section V.

If the answer to decision block 114 or to decision block 118 is no, a signal is sent from the MCD through the computer to the weld controller that an error has occurred and no weld should be delivered, per data block 122. Upon delivering the signal, control is returned to the operational sequence of FIG. 9.

Referring once again to FIG. 9, if the answer to decision block 106 is no or if control has been returned from the weld process 108, the program within the MCD questions whether an instruction has been received to move to an open position, per decision block 124. If the instruction has been received, the actuator moves the tip to an open position, per operations block 126. Once the open position has been achieved by the actuator, or if the open instruction was not received, the program within the MCD questions whether there is a request to perform a special function, per decision block 128. If there is no request for performance of a special function, the program within the MCD returns to decision block 106 thereby questioning once again whether a weld is to be performed.

If there is a request for performance of a special function, the special function operations begin, per operations block 130 and control of the program within the MCD proceeds per the flowchart of FIG. 11. Generally, the special functions portion of the program are those operations described in detail in section III.A. above, i.e., System Operation—Setup and Characterization. However, note that section III.A.iv. regarding open position parameters and section III.A.v. regarding weld schedule parameters have been omitted from FIG. 11 for clarity since they involve no movement of the actuator but only user entries and computer calculations As such, the special functions depicted in FIG. 11 include, per decision block 132: 1. define limit—the sequence by which actuator position limits and weld gun position limits are established (described in Section III.A.i above); 2. Calibration—calibrating the torque output to the force seen by the weld gun (described in Section III.A.ii. above); 3. Define Close—the point at which the weld tips reach a hard stop (described in Section III.A.iii. above); and 4. Tip Wear Check—determining the wear that has occurred to the tips based on the defined close position (described in Section III.A.iii above).

In the instance of the selection of choice number 1 ("define limit"), the actuator moves itself or the tips to a hard stop, per operations block 134, wherein the position of the actuator is recorded within the program as a never exceed limit, per operations block 136. Selection of choice number 2 ("calibration") results in the actuator moving to a position to gauge thickness, per operations block 138. Torque is then applied through the actuator at predefined increments until a pre-established limit is reached, per operations block 140. The actuator is then moved to an open position, per block 142.

Selection of choice number 3 ("define close") results in the actuator moving the weld tip until a hard stop is reached, per operations block 144. Selection of choice number 4 ("tip wear check") results in the actuator moving the weld tip to a closed position, per operations block 146, wherein the program determines whether the position of the tip is beyond a pre-defined wear position, per decision block 148. If the tip is beyond a pre-defined wear position, a signal is sent that the max tip wear has been reached, per operations block 150.

Upon completion of all of the special functions, the operation of the weld axis system returns to the operations sequence of FIG. 9.

V. System Operation—Motion Profile

Figure 12:
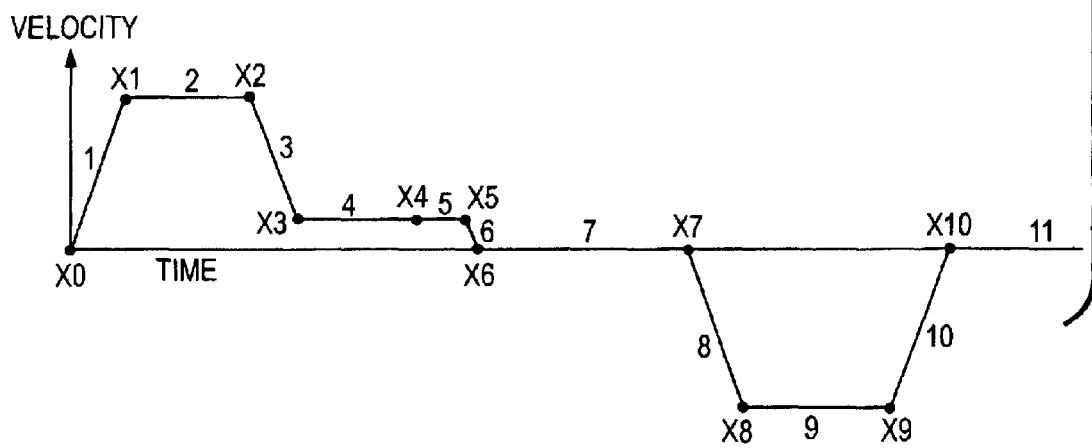
FIG. 12 depicts the preferred weld motion profile of the weld axis system.

The preferred motion profile, i.e., the definition of an objects position and velocity relationships in time during a move, used by the weld axis system 20 for movement of the weld tip during a weld cycle is shown in FIG. 12. A table describing each segment of the motion profile with typical values, e.g., accelerations/decelerations, initial and final velocities, time, and distance traveled is provided. Of course, the values are provided by way of example only and are dependent upon the application of the weld axis system and the program of the weld axis system as set-up and characterized by the user.

As indicated, segment one of the motion profile indicates the actuator accelerating the tip to a desired velocity to initiate closure of the tips. Per segment two, the desired velocity has been reached and is maintained until a deceleration is desired to effect tip closure. Per segment three, the actuator decelerates to a desired tip closing velocity. Per segment four, the desired tip closing velocity has been reached and tip contact is made, per segment five. During segment six, the welding gun arms deflect and the actuator decelerates to a stop. Per segment seven, welding occurs while the actuator is held in position. Per segment eight, the actuator receives the instruction to open the tips and accelerates at high speed to a desired tip opening velocity. Per segment nine, the desired tip opening velocity has been reached and is maintained until a deceleration is desired to complete the tip opening. Per segment ten, deceleration is begun to complete the tip opening process. And, finally, per segment eleven, the tip opening has been completed by the actuator and the actuator waits in position for a new command to close the tips.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed:

1. An adaptable servo-control system for position and/or force actuation, comprising:

an electric linear actuator; and a controller, wherein said controller interfaces with said electric linear actuator and with a plurality of I/O signals that are independent from said electric linear actuator, wherein said I/O signals have been pre-established for control of a pneumatic actuator, and wherein said controller utilizes said I/O signals to provide closed loop-controlled actuation of said electric linear actuator.

2. The system of claim 1, wherein said plurality of I/O signals are mapped by said controller to a plurality of parameters to define a motion profile of said electric linear actuator.

3. An adaptable servo-control system for position and/or force actuation of a welding tip in a welding system, comprising:

an electric linear actuator; and a controller, wherein said controller interfaces with said electric linear actuator and with a plurality of I/O signals that are independent from said electric linear actuator, wherein said I/O signals have been pre-established for control of a pneumatic actuator, and wherein said controller utilizes said I/O signals to provide position and/or force actuation of said welding tip through closed loop-controlled actuation of said electric linear actuator.

4. The system of claim 3, said plurality of I/O signals are mapped by said controller to a plurality of parameters to define a motion profile of said electric linear actuator.

* * * * *